Dec. 15, 1964 J. L. DAY 3,161,009
ARMOR ROD APPLYING TOOL
Filed Aug. 1, 1963
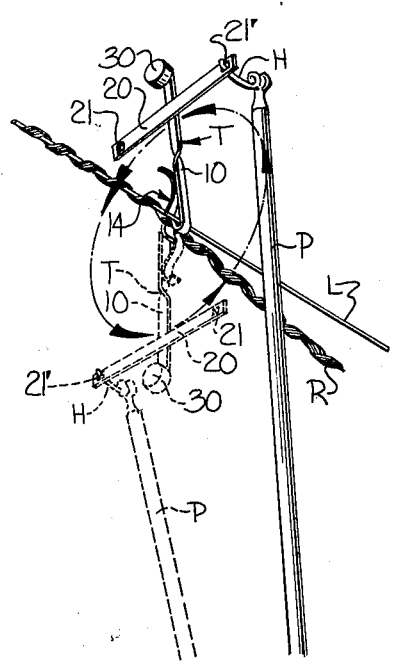
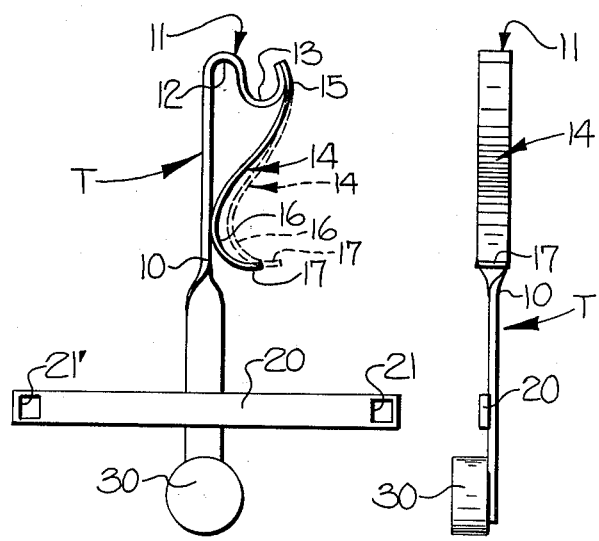
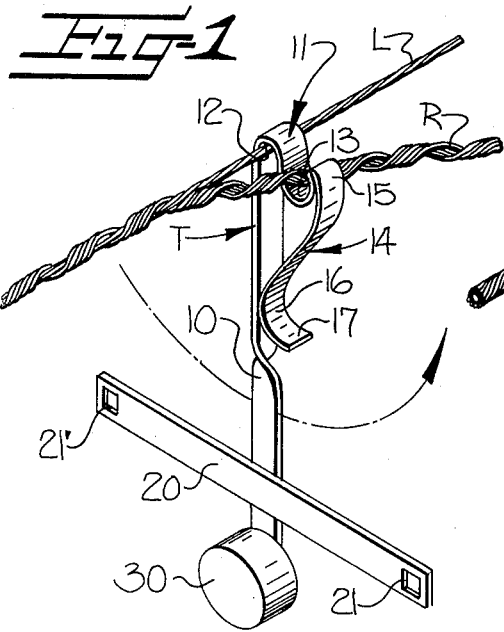
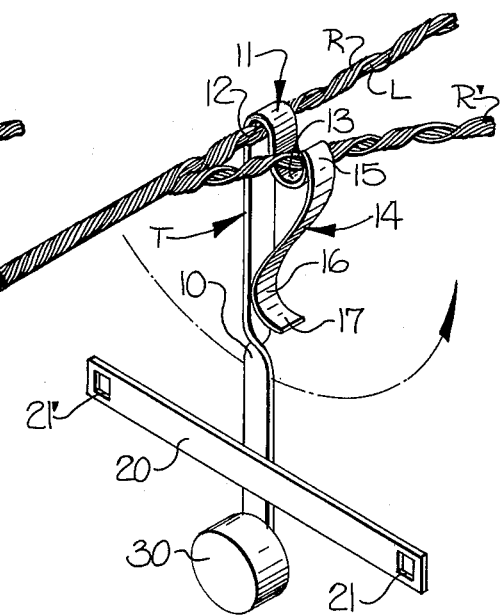
INVENTOR:
JAMES L. DAY
BY
Eaton, Bell, Hunt & Seltzer
ATTORNEYS

United States Patent Office 3,161,009
Patented Dec. 15, 1964

3,161,009
ARMOR ROD APPLYING TOOL
James L. Day, 1431 N. Modena, Gastonia, N.C., assignor of fifty percent to Brinton W. Pressley, Gastonia, N.C.
Filed Aug. 1, 1963, Ser. No. 299,369
9 Claims. (Cl. 57—10)

This invention relates to the applicaiton of armor to high tension electric transmission lines or the like, and more specifically to a tool for wrapping preformed, helically wound armor rod around such lines.

It is well known that it is often necessary or advisable to add additional strands of wire to electric transmission lines or cables suspended from insulators, particularly where there is a considerable amount of stress, tension, bending and/or swaying of such lines. Further it is well known to apply such additional strands of wire in the form of relatively stiff, pre-formed, helically wound armor rods, as disclosed in U.S. Patent No. 2,947,504, for example. Such armor rods are elongated elements of appropriate strength and rigidity which are first pre-formed into a helix having an internal diameter smaller than the line about which it is to be wrapped, and having a sufficiently open pitch so as to be wrapped around the line without exceeding the elastic limit of the material from which the armor rods are made. If total coverage of a particular segment of the line is desired, two or more helices are employed, the second and subsequent armor rods being wound between adjacent convolutions of the first helix. Additionally, for preventing relative movement between the transmission line and the armor rod, a suitable grit-like material is normally employed between the respective contacting surfaces of line and armor rod.

Heretofore, the winding of such helically preformed armor rod onto transmission lines has been accomplished, for example, through the use of needle dies which generally require the partial unwinding and splitting of the armor rod into two or more groups and then threading the same through apertures in the needle die. The needle die is then rotated about the line to thus wind the groups of split armor rod thereon. Such method of application is obviously both tedious and time consuming, particularly when, as is the usual case, the portion of transmission line to be wrapped is in an elevated, or somewhat inaccessible, position. Additionally, such operation tends to remove some of the grit-like material normally placed on the armor rod to insure proper gripping of the contacting surfaces. Finally, and perhaps most importantly, the use of needle dies usually requires de-energization of the transmission line which, of course, results in interruption of customer service.

Another existing method of application of armor rod centers around the use of suitably designed hot poles permitting an operator to grasp and manually twist the armor rod around the line. Here again, such method of application is most tedious and time consuming and requires repeated disengagement and re-grasping of the armor rod after each revolution thereof around the transmission line.

With the foregoing in mind, it is the primary object of this invention to provide a novel tool for rapidly and efficiently wrapping helically, pre-formed armor rod around high tension electric transmission lines or the like without the necessity for de-energization of such transmission lines during armor rod winding operations.

It is another object of this invention to provide a tool of the type described which is readily positionable on a transmission line and is maintained in engagement with such line and armor rod at all times during the armor rod winding operation.

Some of the objects of the invention having been stated, other objects will appear as the description proceeds, when taken in connection with the accompanying drawings, in which—

FIGURE 1 is a perspective view of a tool embodying the instant invention in use wrapping a helically, pre-formed armor rod around an elevated electric transmission line and showing such tool in solid lines in an inverted position above the line and in dotted lines in a normal position hanging below the line;

FIGURES 2 and 3 are enlarged front and side elevational views of said tool, respectively;

FIGURE 4 is an enlarged view similar to FIGURE 1, but showing said tool in its normal position hanging downwardly from a transmission line and showing a first helically, pre-formed armor rod partially wrapped on such line; and FIGURE 5 is similar FIGURE 4, but showing said first helically, pre-formed armor rod completely wrapped around said line and showing a second helically, pre-formed armor rod partially wrapped on such line between adjacent convolutions of said first armor rod.

Referring now more specifically to the figures, the letter T is used to broadly designate a tool constructed in accordance with the present invention.

As shown, the tool T is provided with an elongate vertical shank or bar 10 having a 90 degree twist in the medial portion thereof. The shank 10 is preferably formed from conventional bar stock, and thus, rectangular in cross-section. A substantially sinusoidal member broadly indicated at 11 is carried by and extends horizontally from one side of the upper end of the shank 10 and defines a downwardly opening or line engaging hook 12, positioned adjacent the shank 10, and an upwardly opening or armor engaging hook 13 positioned adjacent the hook 12. Preferably, the member 11 is also formed from bar stock and can be, as shown in the figures, a mere continuation of the shank 10 bent into the pre-formed substantially sinusoidal configuration.

As shown in FIGURES 4 and 5, the downwardly opening hook 12 is adapted to engage transmission line L and support the tool T on such line for rotation thereabout, while the upwardly opening hook 13 is adapted to receive armor rod R therein and guide the same onto and around the line L upon rotation of the tool T in the direction of the arrows. The direction of the arrows, it will be noted, corresponds to the direction of the helical windings of the armor and rod R.

As stated above, the member 11, and thus the hook 12, is preferably formed from bar stock to thereby give a relatively wide point of contact between the hook 12 and line L when the tool is positioned on the line. Such relatively wide point of contact contributes substantially to the stability of the tool when mounted on the line by reducing any tendency of the tool to swing longitudinally of the line.

It will be appreciated that the nature of the downwardly opening hook 12 is such that the same will not necessarily support the tool T when in an inverted position above the line L. Thus, to prevent the tool T from inadvertently falling off the line, I preferably provide an elongate resilient member or spring broadly indicated at 14 on the outer end of the sinusoidal member 11. As shown, the member 14 has its upper end 15 attached to the hook 13, its medial portion 16 normally positioned closely adjacent, and preferably in engagement with, a medial portion of the shank 10, and its lower end bent outwardly of the shank 10 and forming a cam surface 17 which is adapted to be engaged by the line L for relative movement of the medial portion 16 away from the shank 10 (as shown in dotted lines in FIGURE 2) to thereby permit engagement of the hook 12 on the line, as will be discussed more fully hereinafter.

As further shown in all of the figures, a horizontal cross arm 20 is mounted on a lower portion of the shank 10 and secured at a medial portion along its length to said shank, as by welding. Preferably, each end portion of the arm 20 is provided with an opening 21, 21', which openings are adapted to receive a hook H of a hot pole P (see FIGURE 1) for purposes hereinafter discussed more fully.

Finally, a weight 30 is preferably included on the tool and mounted on the lower portion of the shank 10, as by welding. Such weight 30 serves to bias the tool toward a normal position with shank 10 extending downwardly when the tool is supported on the line.

In operation, as for example, when the transmission line to be wrapped is disposed in a substantially horizontal, elevated position, an operator first places the hook H of hot pole P (FIGURE 1) in one of openings 21 of the cross arm 20 and then elevates the tool to the height of the line through movement of the hot pole upwardly. The operator then manipulates the tool so as to place the line L in the substantially V-shaped portion of the tool defined by the cam surface 17 and the shank 10, and then pulls or pushes the tool (depending upon the position of said V-shaped portion with respect to the line) with sufficient force to cause the line to wedge the spring H outwardly from the shank 10 (as shown in FIGURE 2 in dotted lines) a sufficient distance to permit passage of the line into the opening of the hook 12. Upon completion of the foregoing, the tool T is mounted on the line in its normal position, with the shank 10 extending downwardly.

In the meantime, one end of a helically, preformed armor rod R is suitably secured to the line, as by clamping with a wire holding stick, not shown.

The tool hanging from the line in its normal position is then moved laterally along the line to a point adjacent the clamped end of the armor rod R and manipulated to cause the upwardly opening hook 13 to receive the armor rod therein.

As shown in FIGURE 1, the operator then positions the hook of the hot pole in one of the openings 21 (preferably 21') on the cross arm 20 and rotates the tool upwardly and over the line L in a direction corresponding to the helical windings of the armor rod R to thereby guide the armor rod onto and partially around the line. At this point, the hook of the hot pole is disengaged from the tool, and by virtue of the tool being weighted on its lower end with weight 30, the tool, still guiding the armor rod, falls and completes its revolution about the line. Thereafter, the tool is similarly rotated until the winding of the armor rod R on the line is completed.

It will be noted that in most situations, the pitch of the armor rod helix will be such that the armor engaging hook 13 will ride in the area between adjacent convolutions of the helix and thus cause the tool to move laterally toward the free end of the armor rod as the tool rotates around the line.

Lastly, as pointed out above, the nature of the armor rod helix is such that only one helix will not completely cover a given segment of transmission line. Thus, if complete coverage is desired, it is necessary to wind one or more additional such armor rods onto the line to cover the areas between adjacent convolutions of the first-wound armor rod. To this end, for example, and referring to FIGURE 5, a second helically, pre-formed armor rod, R' is suitably secured to and wound around the line in the same manner as that previously described for winding the armor rod R about the line.

In the drawings and specification there has been set forth a preferred embodiment of the invention and although specific terms are employed, they are used in a generic and descriptive sense only and not for purposes of limitation, the scope of the invention being defined in the claims:

I claim:

1. A tool for wrapping pre-formed, helically wound armor rod around an electric transmission line or the like, said tool comprising
   (a) an elongate vertical shank;
   (b) a downwardly opening hook carried by the upper end of said shank and adapted to engage the line for supporting the tool on the line for rotation thereabout;
   (c) guide means carried by said shank adjacent said hook and adapted to receive armor rod therein for guiding the armor rod onto and around the line upon rotation of the tool about the line in a direction corresponding to the direction of the helical windings of the armor rod; and
   (d) an elongate resilient member carried by said shank and having a portion thereof positioned closely adjacent a medial portion of said shank and normally forming a closure for the opening of said hook, said portion of said resilient member being adapted to be displaced from said medial portion of said shank for passage of the line upwardly and into engagement with said hook, whereby said closure serves to prevent inadvertent displacement of the tool from the line during rotation of the tool about the line.

2. A tool for wrapping pre-formed, helically wound armor rod around a substantially horizontally disposed electric transmission line or the like, said tool comprising
   (a) an elongate vertical shank;
   (b) a downwardly opening hook carried by the upper end of said shank and adapted to engage the line for supporting the tool on the line for rotation thereabout;
   (c) guide means carried by said shank adjacent said hook and adapted to receive armor rod therein for guiding the armor rod onto and around the line upon rotation of the tool about the line in a direction corresponding to the direction of the helical windings of the armor rod;
   (d) an elongate resilient member carried by said shank and having a portion thereof positioned closely adjacent a medial portion of said shank and normally forming a closure for the opening of said hook, said portion of said resilient member being adapted to be displaced from said medial portion of said shank for passage of the line upwardly and into engagement with said hook, whereby said closure serves to prevent inadvertent displacement of the tool from the line during rotation of the tool about the line; and
   (e) means carried by said shank for biasing the tool toward a normal position with said shank extending downwardly when the tool is supported on the line, whereby upon rotation of the tool and consequent movement of the shank upwardly and over the line, said last recited means (e) serves to cause the tool to move downwardly and return to said normal position.

3. A tool for wrapping pre-formed, helically wound armor rod around an electric transmission line or the like, said tool comprising
   (a) an elongate vertical shank;
   (b) a downwardly opening hook carried by the upper end of said shank and adapted to engage the line for supporting the tool on the line for rotation thereabout;
   (c) guide means carried by said shank adjacent said hook and adapted to receive armor rod therein for guiding the armor rod onto and around the line upon rotation of the tool about the line in a direction corresponding to the direction of the helical windings of the armor rod;
   (d) an elongate resilient member carried by said shank and having a portion thereof positioned closely adjacent a medial portion of said shank and normally forming a closure for the opening of said hook, said portion of said resilient member being adapted to be displaced from said medial portion of said shank for passage of the line upwardly and into engagement with said hook, whereby said closure serves to prevent inadvertent displacement of the tool from the line during rotation of the tool about the line; and (a) an elongate horizontal member carried by the lower portion of said shank, said horizontal member having an opening in at least one end portion thereof adapted to receive a hook member of a hot pole.

4. A tool for wrapping pre-formed, helically wound armor rod around a substantially horizontally disposed electric transmission line or the like, said tool comprising (a) an elongate vertical shank;
(b) a downwardly opening hook carried by the upper end of said shank and adapted to engage the line for supporting the tool on the line for rotation thereabout;
(c) guide means carried by said shank adjacent said hook and adapted to receive armor rod therein for guiding the armor rod onto and around the line upon rotation of the tool about the line in a direction corresponding to the direction of the helical windings of the armor rod;
(d) an elongate resilient member carried by said shank and having a portion thereof positioned closely adjacent a medial portion of said shank and normally forming a closure for the opening of said hook, said portion of said resilient member being adapted to be displaced from said medial portion of said shank for passage of the line upwardly and into engagement with said hook, whereby said closure serves to prevent inadvertent displacement of the tool from the line during rotation of the tool about the line;
(e) an elongate horizontal member carried by the lower portion of said shank, said horizontal member having an opening in at least one end portion thereof adapted to receive a hook member of a hot pole; and
(f) a weight carried by the lower portion of said shank for biasing said tool toward a normal position with said shank extending downwardly when the tool is supported on the line, whereby upon rotation of the tool and consequent movement of the shank upwardly and over the line, said weight serves to cause the tool to move downwardly and return to said normal position.

5. A tool for wrapping pre-formed, helically wound armor rod around an electric transmission line or the like, said tool comprising (a) an elongate vertical shank;
(b) a substantially sinusoidal member carried by the upper end of said shank and extending horizontally from one side thereof, said sinusoidal member defining
  (1) a downwardly opening first hook positioned adjacent said shank and adapted to engage the line and support the tool for rotation thereabout, and
  (2) an upwardly opening second hook positioned adjacent said first hook and adapted to receive armor rod therein and guide the same onto and around the line upon rotation of the tool about the line in a direction corresponding to the direction of the helical windings of the armor rod; and
(c) an elongate resilient member having one end thereof connected to said sinusoidal member and having a medial portion thereof positioned closely adjacent said shank to close the opening of said first hook and adapted to prevent inadvertent falling of the tool from the line during rotation thereof, the other end of said resilient member projecting outwardly from said shank and forming a cam surface adapted to be engaged by the line for movement of the medial portion of said resilient member away from said shank to permit engagement of said first hook on the line.

6. A tool for wrapping pre-formed, helically wound armor rod around a substantially horizontally disposed electric transmission line or the like, said tool comprising (a) an elongate vertical shank;
(b) a substantially sinusoidal member carried by the upper end of said shank and extending horizontally from one side thereof, said sinusoidal member defining
  (1) a downwardly opening first hook positioned adjacent said shank and adapted to engage the line and support the tool for rotation thereabout, and
  (2) an upwardly opening second hook positioned adjacent said first hook and adapted to receive armor rod therein and guide the same onto and around the line upon rotation of the tool about the line in a direction corresponding to the direction of the helical windings of the armor rod; and
(c) means carried by said shank for biasing said tool toward a normal position with said shank extending downwardly when the tool is supported on the line, whereby upon rotation of the tool and consequent movement of the shank upwardly and over the line, said means (c) serves to cause the tool to move downwardly and return to said normal position.

7. A tool for wrapping pre-formed, helically wound armor rod around a substantially horizontally disposed electric transmission line or the like, said tool comprising (a) an elongate vertical shank;
(b) a substantially sinusoidal member carried by the upper end of said shank and extending horizontally from one side thereof, said sinusoidal member defining
  (1) a downwardly opening first hook positioned adjacent said shank and adapted to engage the line and support the tool for rotation thereabout, and
  (2) an upwardly opening second hook positioned adjacent said first hook and adapted to receive armor rod therein and guide the same onto and around the line upon rotation of the tool about the line in a direction corresponding to the direction of the helical windings of the armor rod;
(c) an elongate resilient member having one end thereof connected to said sinusoidal member and having a medial portion thereof positioned closely adjacent said shank to close the opening of said first hook and adapted to prevent inadvertent falling of the tool from the line during rotation thereof, the other end of said resilient member projecting outwardly from said shank and forming a cam surface adapted to be engaged by the line for movement of the medial portion of said resilient member away from said shank to permit engagement of said first hook on the line; and
(d) means carried by said shank for biasing the tool toward a normal position with said shank extending downwardly when the tool is supported on the line, whereby upon rotation of the tool and consequent movement of the shank upwardly and over the line, said last recited means (d) serves to cause the tool to move downwardly and return to said normal position.

8. A tool for wrapping pre-formed, helically wound armor rod around a substantially horizontally disposed electric transmission line or the like, said tool comprising
  (a) an elongate vertical shank having a rectangular cross-section;
  (b) a substantially sinusoidal member carried by the upper end of said shank and extending horizontally from one side thereof, said sinusoidal member also having a rectangular cross-section and defining
    (1) a downwardly opening first hook positioned adjacent said shank and adapted to engage the line and support the tool for rotation thereabout, and
    (2) an upwardly opening second hook positioned adjacent said first hook and adapted to receive armor rod therein and guide the same onto and around the line upon rotation of the tool about the line in a direction corresponding to the direction of the helical windings of the armor rod;
  (c) an elongate resilient member having one end thereof connected to said sinusoidal member and having a medial portion thereof normally engaging said shank to close the opening of said first hook and adapted to prevent inadvertent falling of the tool from the line during rotation thereof,
  the other end of said resilient member projecting outwardly from said shank and forming a cam surface adapted to be engaged by the line for movement of the medial portion of said resilient member away from said shank to permit engagement of said first hook on the line; and
  (d) a weight carried by said shank for biasing the tool toward a normal position with said shank extending downwardly when the tool is supported on the line, whereby upon rotation of the tool and consequent movement of the shank upwardly and over the line, said weight serves to cause the tool to move downwardly and return to said normal position.

9. A tool for wrapping pre-formed, helically wound armor rod around a substantially horizontally disposed electric transmission line or the like, said tool comprising
  (a) an elongate vertical shank having a rectangular cross-section and being twisted 90 degrees in a medial portion thereof along its length;
  (b) a substantially sinusoidal member carried by the upper end of said shank and extending horizontally from one side thereof, said sinusoidal member also having a rectangular cross-section and defining
    (1) a downwardly opening first hook positioned adjacent said shank and adapted to engage the line and support the tool for rotation thereabout, and
    (2) an upwardly opening second hook positioned adjacent said first hook and adapted to receive armor rod therein and guide the same onto and around the line upon rotation of the tool about the line in a direction corresponding to the direction of the helical windings of the armor rod;
  (c) an elongate resilient member having one end thereof connected to said sinusoidal member and having a medial portion thereof normally engaging said shank to close the opening of said first hook and adapted to prevent inadvertent falling of the tool from the line during rotation thereof about the line, the other end of said resilient member projecting outwardly from said shank and forming a cam surface adapted to be engaged by the line for movement of the medial portion of said resilient member away from said shank to permit engagement of said first hook on the line;
  (d) an elongate transverse cross arm carried by said shank below said medial portion thereof, said cross arm extending outwardly from each side of said shank and having openings in each end portion thereof adapted to receive a hook member of a hot pole; and
  (e) a weight carried by the lower end of said shank for biasing said tool toward a normal position with said shank extending downwardly when the tool is supported on the line, whereby upon rotation of the tool and consequent movement of the shank upwardly and over the line, said weight serves to cause the tool to move downwardly and return to said normal position.

References Cited by the Examiner

UNITED STATES PATENTS

| | | | |
|---|---|---|---|
| 2,390,674 | 12/45 | White | 57—10 X |
| 2,414,136 | 1/47 | Bodenieck | 57—10 |
| 2,494,285 | 1/50 | Clapp | 57—160 X |
| 2,674,084 | 4/54 | Ratte et al. | 57—10 |

FOREIGN PATENTS

| | | |
|---|---|---|
| 253,321 | 6/26 | Great Britain. |

MERVIN STEIN, *Primary Examiner.*